(12) United States Patent
Oudom et al.

(10) Patent No.: US 9,669,941 B1
(45) Date of Patent: Jun. 6, 2017

(54) WEATHER INDICATOR SYSTEM AND METHOD

(71) Applicant: Rockwell Collins, Inc., Cedar Rapids, IA (US)

(72) Inventors: Jod Viengngern Oudom, Portland, OR (US); Jillian Cae Whitaker, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/011,570

(22) Filed: Jan. 31, 2016

(51) Int. Cl.
*G01C 21/00* (2006.01)
*B64D 45/00* (2006.01)
*G01W 1/00* (2006.01)

(52) U.S. Cl.
CPC ............. *B64D 45/00* (2013.01); *G01W 1/00* (2013.01)

(58) Field of Classification Search
CPC ................................ B64D 45/00; G01C 23/00
USPC ............... 340/971, 905, 973, 979, 959, 960; 345/619, 418; 701/14–16, 415
See application file for complete search history.

(56) References Cited

U.S. PATENT DOCUMENTS

| | | | |
|---|---|---|---|
| 4,706,198 A | 11/1987 | Thurman | |
| 6,199,008 B1 * | 3/2001 | Aratow | G01C 23/00 701/120 |
| 7,693,621 B1 * | 4/2010 | Chamas | G08G 5/0021 340/951 |
| 7,965,223 B1 * | 6/2011 | McCusker | G01S 13/913 340/961 |
| 8,195,347 B2 * | 6/2012 | Boorman | G08G 5/025 701/14 |
| 8,874,288 B1 | 10/2014 | Siddiqi | |
| 9,002,544 B1 * | 4/2015 | Seah | G01C 23/005 701/16 |
| 9,020,665 B1 | 4/2015 | Espenses et al. | |
| 2006/0085164 A1 | 4/2006 | Leyton et al. | |
| 2013/0226452 A1 | 8/2013 | Watts | |
| 2014/0129058 A1 | 5/2014 | Elahi et al. | |

* cited by examiner

*Primary Examiner* — Toan N Pham
(74) *Attorney, Agent, or Firm* — Daniel M. Barbieri; Donna P. Suchy; Angel N. Gerdzhikov

(57) ABSTRACT

A weather indicator system and method for generating and presenting weather indicator(s) are disclosed. The weather indicator may include two or more ceiling indicators for presenting minimum and reported ceilings, two or more visibility indicators for presenting minimum and reported visibilities, and at least one scale from which the ceiling and visibility information may be presented to a viewer by the ceiling and visibility indicators, respectively. An indicator generating system could include a source(s) of weather data and an image generator configured to acquire weather data from the source(s) of weather data and generate presentation data representative of the weather indicator as a function of the weather data.

20 Claims, 11 Drawing Sheets

WEATHER INDICATOR SYSTEM AND METHOD

BACKGROUND

The Federal Aviation Administration of the United States (FAA) publishes a manual entitled "Instrument Flying Handbook," a publication to which pilots may refer when being trained to fly under instrument flight rules (IFR). Part of training involves the use of an instrument approach procedure (IAP) chart which provides the method to descend and land safely on a runway in low visibility conditions. The FAA establishes an IAP after thorough analyses of obstruction, terrain features, and navigational facilities. Maneuvers, including altitude changes, course corrections, and other limitations, are prescribed in the IAP. The approach charts, commonly referred to as approach plates, reflect the criteria associated with the United States Standard for Terminal Instrument Approach Procedures (TERPs), which prescribes standardization methods for use in designing instrument flight procedures.

The use of a particular IAP may depend upon reported weather conditions that are currently being observed and/or forecasted at an airport or an area encompassing the aircraft. Each IAP includes "landing minimums" or "landing minima" that have been established and/or predefined for the IAP. Landing minima includes predefined criteria corresponding to ceiling and visibility requirements of the IAP. If reported weather information and/or forecasted weather information is less than or "below" one and/or both landing minimums for a particular IAP, it might not be suitable and/or advisable for the pilot to attempt the procedure.

As part of their routine procedures, pilots are informed of weather conditions at certain locations such as the airport from which they are departing, the airport at which they plan to arrive, and/or an alternative airport (if, for example, the weather conditions at the arrival airport are below landing minimums). There are a plurality of weather data sources from which the pilot may obtain weather information. With this information, the pilot may compare the weather information with the landing minimums of one or more IAPs (or in some cases, predefined takeoff minimums establishing weather criteria corresponding to a takeoff and departure from an airport) and determined the suitability of the one or more IAPs. As the pilot performs this comparison, however, a loss of situational awareness could result as the pilot shifts his or her eyes and concentration between the weather information and one or more IAP charts.

SUMMARY

Embodiments of the inventive concepts disclosed herein are directed to a weather indicator system and method for generating and presenting weather indicator(s). The inventive concepts disclosed herein may provide weather information and landing minimums to the pilot of an aircraft in compact, easily viewable weather indicator(s).

In one aspect, embodiments of the inventive concepts disclosed herein are directed to a weather indicator for presenting weather information. The weather indicator may include two or more ceiling indicators for presenting minimum and reported ceilings, two or more visibility indicators for presenting minimum and reported visibilities, and at least one scale from which the ceiling and visibility information may be presented to a viewer by the ceiling and visibility indicators, respectively.

In a further aspect, embodiments of the inventive concepts disclosed herein are directed to a system for generating the weather indicator for presenting weather information. The system could include a source(s) of weather data and an image generator (IG) configured to perform the method as disclosed in the following paragraph.

In a further aspect, embodiments of the inventive concepts disclosed herein are directed to a method for generating the weather indicator for presenting weather information. When properly configured, the IG may acquire weather data and generate presentation data as a function of the weather data and representative of an image of the weather indicator. The weather data could be representative of a predefined minimum ceiling, a predefined minimum visibility, a reported ceiling, and a reported visibility. The presentation data could be representative of the ceiling indicators, the visibility indicators, and the scale; the position of a minimum visibility indicator could be dependent upon the predefined minimum visibility, the position of one ceiling indicator could be dependent upon the reported ceiling, and the position of the visibility indicator could be dependent upon the reported visibility.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
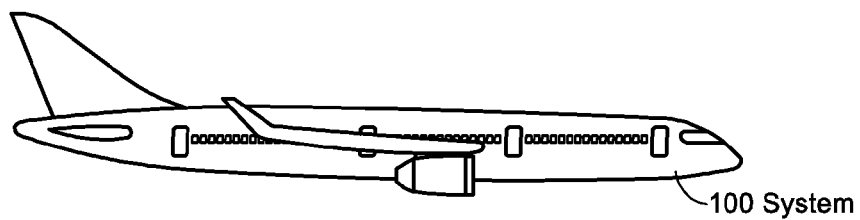
FIG. 1A depicts an aircraft configured with a weather indicator system according to the inventive concepts disclosed herein.
Figure 1B:
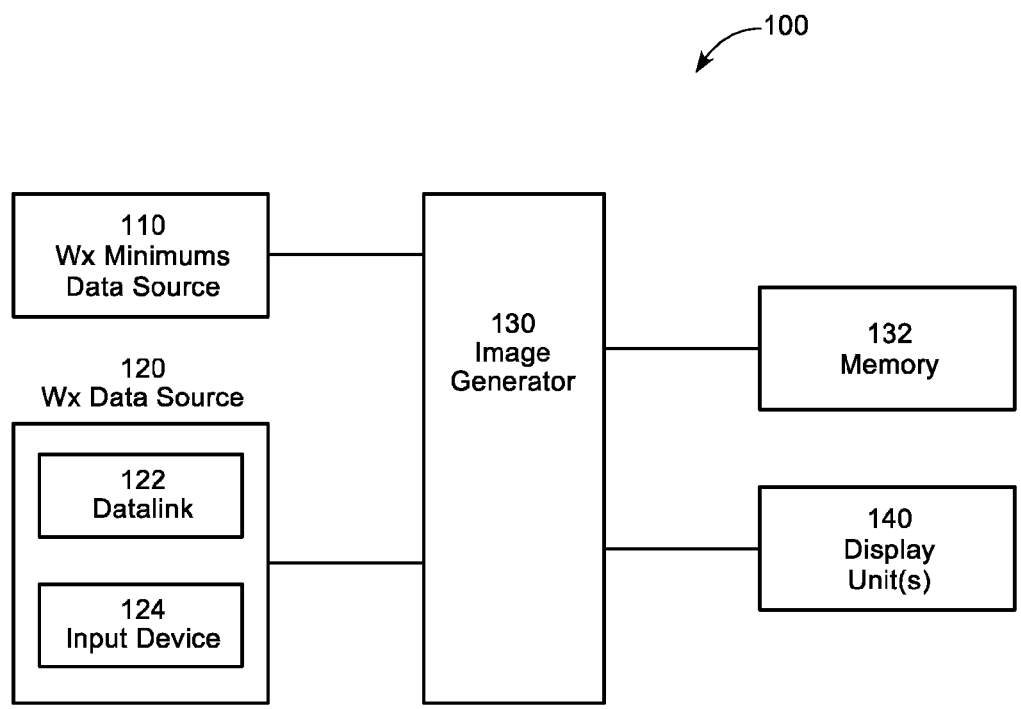
FIG. 1B depicts a functional block diagram of the weather indicator system of FIG. 1A.

Referring now to FIGS. 1A-1B an embodiment of a weather indicator system 100 suitable for implementation of the techniques described herein includes a weather minimums data source (WMDS) 110, a weather data source (WDS) 120, an image generator (IG) 130, and a display unit(s) 140.

The WMDS 110 could include any source(s) which provides weather minimum information in an aircraft. The weather minimum information could include predefined landing minima of an instrument approach procedure (IAP) of an airport runway, where the predefined landing minima could include a minimum ceiling and a minimum for each IAP.

The WDS 120 could include of any source of reported weather data including, but not limited to, a datalink system 122 and/or an input device 124. The datalink system 122 could be include those system(s) configured to receive data from source(s) external to the aircraft including, but not limited to, ground stations and satellites. Data representative of reported weather information could be transmitted to the pilot or flight crew of an aircraft via the datalink system which could provide reported weather information data representative of observed and/or forecasted ceiling and visibility information for the departure, destination and/or alternate airports such as, for instance, those specified in a filed flight plan. Weather data transmitted through the datalink system 122 could originate from or be provided by a plurality of weather data sources including, but not limited to, XM Satellite Radio, Inc., and Universal Weather and Aviation, Inc. Weather data that may be broadcast could include data contained in a variety of weather products such as, but not limited to, Aviation Routine Weather Report ("METAR"). The datalink system 122 may provide weather data representative of weather minimum information to the IG 130.

The input device 124 could include any source for receiving a pilot's input of data representative of reported weather information. Such devices could include, but are not limited to, a tactile device (e.g., keyboard, control display unit, cursor control device, stylus, electronic grease pen, handheld device, touch screen device, notebook, tablet, electronic flight bag, or a user-wearable device) and/or speech recognition systems. The input device 124 could be integrated with a display unit of the display system 140 if it is configured to receive pilot input (e.g., handheld device, touch screen device, notebook, tablet). The input device 124 may provide weather data representative of reported weather information and/or weather minimum information including a pilot's selection to the IG 130.

The IG 130 could include any electronic data processing unit which executes software or computer instruction code that could be stored, permanently or temporarily, in a digital memory storage device or a non-transitory computer-readable media (generally, memory 132) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The IG 130 may be driven by the execution of software or computer instruction code containing algorithms developed for the specific functions embodied herein. The IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 130 could also include more than one electronic data processing unit. In some embodiments, the IG 130 could be a processor(s) used by or in conjunction with any other system of the aircraft including, but not limited to, the WMDS 110, the WDS 120, and the display units(s) 140.

In some embodiments, the terms "programmed" and "configured" are synonymous. The IG 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the IG 130 via a physical or a virtual computer port. The IG 130 may be programmed or configured to execute the method discussed in detail below. The IG 130 may be programmed or configured to provide output data to various systems and/or units including, but not limited to, the display unit(s) 140.

The display unit(s) 140 could be capable of projecting and/or presenting one or more display(s) and/or image(s) of one or more weather indicators; in some embodiments, the terms "display" and "image" are interchangeable and treated synonymously. Weather indicators may be displayed graphically and/or textually as disclosed below. Weather indicators may change visual appearances when, for instance, the reported weather information is less than or equal to the weather minimum information.

Figure 2A:
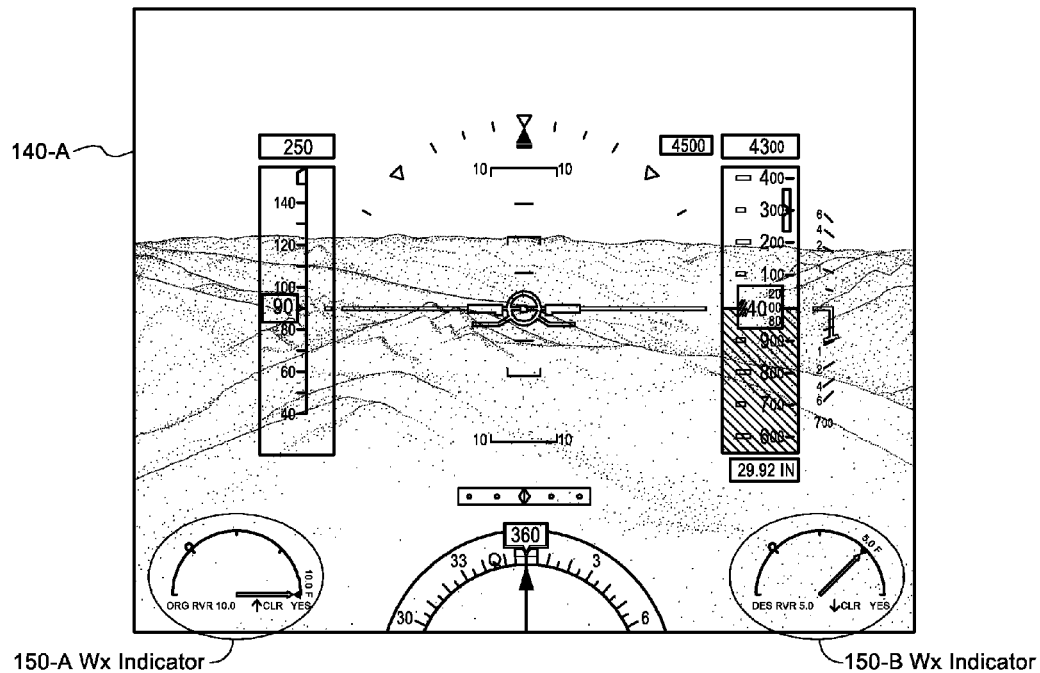
FIG. 2A presents an exemplary embodiment of weather indicators being presented on a Head-Down Display unit according to the inventive concepts disclosed herein.
Figure 2B:
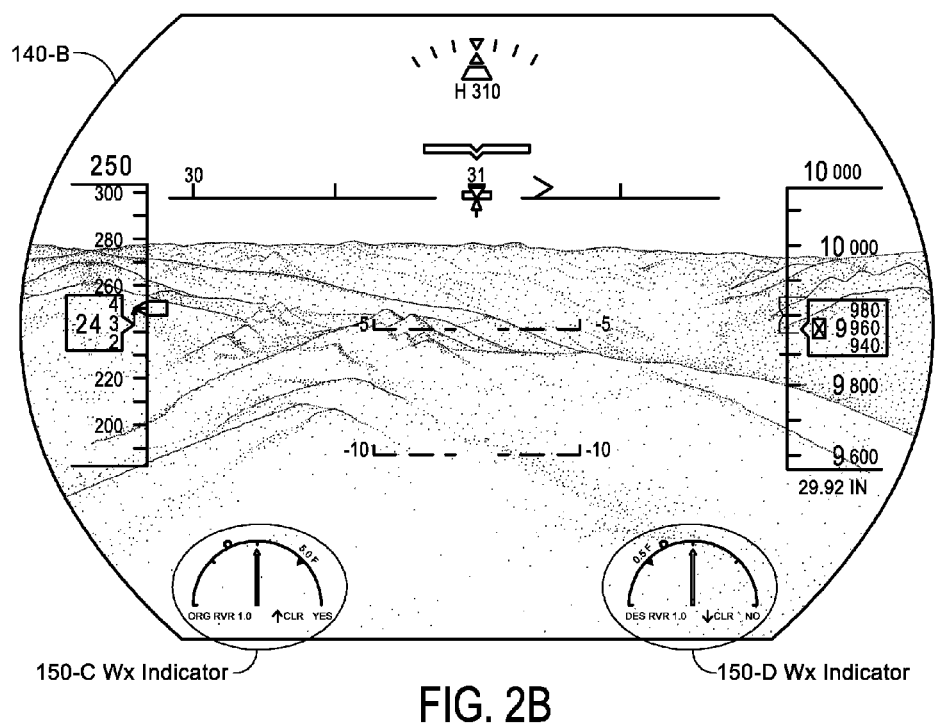
FIG. 2B presents an exemplary embodiment of weather indicators being presented on a Head-Up Display unit according to the inventive concepts disclosed herein.

Referring now to FIG. 2A, an exemplary depiction of a display unit 140-A that is an HDD has been configured to display an image of tactical information to the pilot or flight crew against the background of a three-dimensional image of terrain and sky. FIG. 2B provides an exemplary depiction of a display unit 140-B that is a HUD unit configured to display an image of tactical information to the pilot or flight crew against the background of a three-dimensional image of terrain and sky. Both the HDD unit and HUD unit could be employed as display units configured to present SVS image(s), EVS image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or tactical information shown in FIGS. 2A and 2B are well-known to those skilled in the art, a discussion of the specific tactical information shown on them is not provided herein.

In addition, the display unit 140-A presents weather indicators 150-A and 150-B, and the display unit 140-B presents weather indicators 150-C and 150-D. The locations for presenting the weather indicators 150-A, 150-B, 150-C, and 150-D may be configurable by a manufacturer and/or end-user. In FIGS. 2A and 2B, the weather indicators 150-A, 150-B, 150-C, and 150-D have been positioned at a lower portion of the images of tactical information; that is, the weather indicators 150-A, 150-B, 150-C, and 150-D have been positioned below the images of the airspeed indicators, the attitude indicators, and the altitude indicators shown in FIGS. 2A and 2B. In some embodiments, the weather indicators 150-A and 150-C could display weather information for a first airport, and the weather indicators 150-B and 150-D could display weather information for a second airport.

Some advantages and benefits of the inventive concepts disclosed herein are shown in FIGS. 3A through 8C, illustrating how weather information may be used to generate one or more weather indicators and enhance situational awareness by visually conveying to the pilot observed and/or forecasted weather information applicable to one or more IAPs at destination and/or alternate airports. Upon being viewed, the pilot could determine the presence of one or more favorable IAPs at an airport.

Figure 3A:
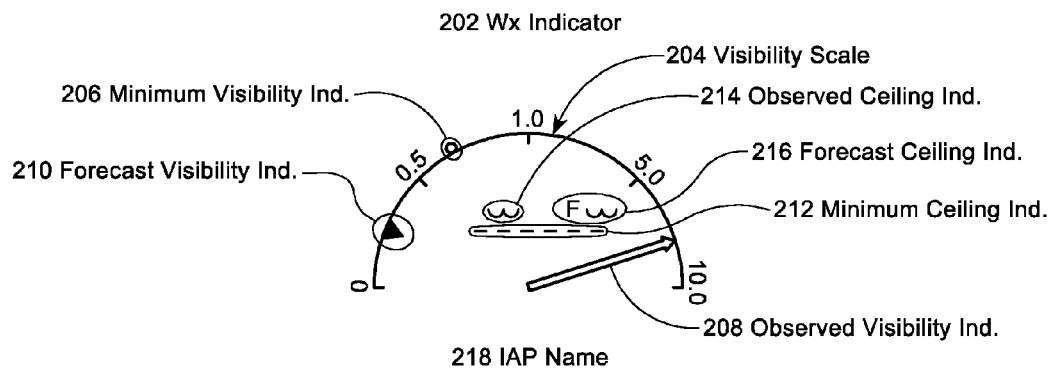
FIG. 3A depicts an exemplary embodiment of an exemplary configuration of a weather indicator according to the inventive concepts disclosed herein.

Referring now to FIG. 3A, a weather indicator 202 presentable by the display unit 140 and exemplary of the inventive concepts disclosed herein is illustrated. The weather indicator 202 includes a visibility scale 204, a minimum visibility indicator 206, an observed visibility indicator 208, a forecast visibility indictor 210, a minimum ceiling indicator 212, an observed ceiling indicator 214, a forecast ceiling indicator 216, and the name of the IAP 218 to which the landing minima of minimum visibility indicator 206 and the minimum ceiling indicator 212 have been predefined prior to the departure of an aircraft.

The visibility scale 204 may be a scale used to present the minimum visibility indicator 206, the observed visibility indicator 208, and the forecast visibility indicator 210 for the IAP. The spacing of the graduations of the visibility scale 204 may be configurable by a manufacturer and/or end user. The spacing of the graduations is non-linear, providing a wider spectrum for relatively lower visibilities (here, the unit of measurement that is indicated on the scale is statute miles).

The minimum ceiling indicator 212 may be a reference from which the observed ceiling indicator 214 and the forecast ceiling indicator 216 are presented. In some embodiments, the observed ceiling indicator 214 and the forecast ceiling indicator 216 may be configured as one or more graphical representations. The observed ceiling indicator 214 and the forecast ceiling indicator 216 include symbols of clouds, and the letter "F" has been included as part of the forecast ceiling indicator 216; although the configuration of the observed ceiling indicator 214 and the forecast ceiling indicator 216 may be determinable by a manufacturer and/or end user, the known symbol for altocumulus clouds has been selected here to convey the observed and forecast ceilings and not necessarily the presence of altocumulus clouds. In some embodiments, the relative locations of the observed ceiling indicator 214 and the forecast ceiling indicator 216 with respect to the minimum ceiling indicator 212 could visually convey information regarding the observed and forecast ceilings for the IAP. In other embodiments, the symbolic representation of the observed ceiling indicator 214 and the forecast ceiling indicator 216 could be replaced with textual presentation (which could include numerical digits).

Although the weather indicator 202 is drawn to a circular or rounded visibility scale 204, the inventive concepts disclosed herein are not limited to this shapes. Other shapes could be employed by a manufacturer and/or end user.

Figure 3B:
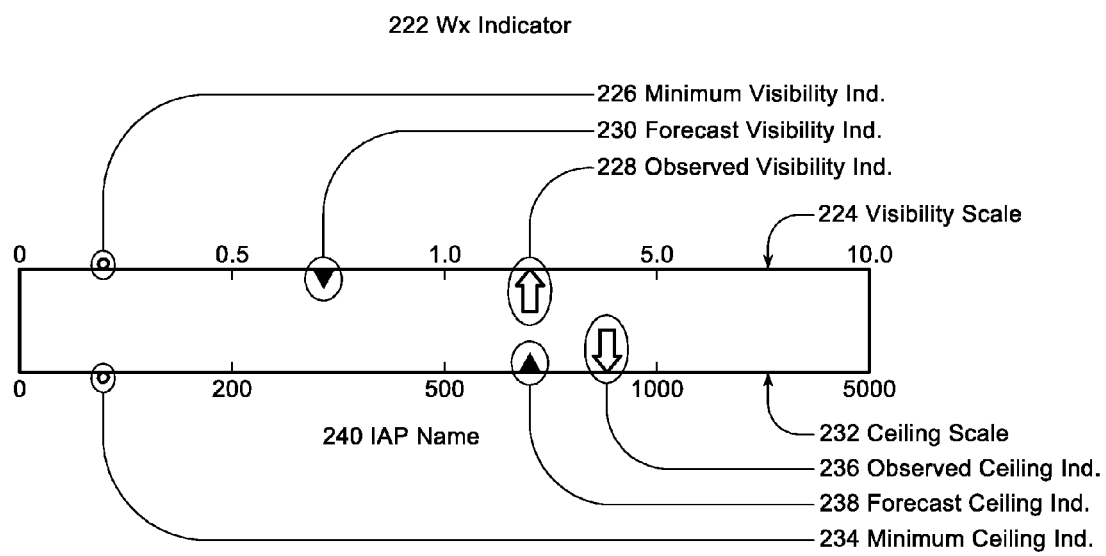
FIG. 3B depicts an exemplary embodiment of an exemplary configuration of a weather indicator according to the inventive concepts disclosed herein.

Referring now to FIG. 3B, a rectangular weather indicator 222 presentable by the display unit 140 and exemplary of the inventive concepts disclosed herein is illustrated. The weather indicator 222 includes a visibility scale 224, a minimum visibility indicator 226, an observed visibility indicator 228, a forecast visibility indictor 230, a ceiling scale 232, a minimum ceiling indicator 234, an observed ceiling indicator 236, a forecast ceiling indicator 238, and the name of the IAP 240 to which the landing minima of minimum visibility indicator 226 and the minimum ceiling indicator 234 have been predefined.

Similar to the visibility scale 204 of FIG. 3A, the visibility scale 224 of FIG. 3B may be a scale used to present the minimum visibility indicator 226, the observed visibility indicator 228, and the forecast visibility indicator 230 for the IAP. The spacing of the graduations of the visibility scale 224 may be configurable by a manufacturer and/or end user. The spacing of the graduations is non-linear, providing a wider spectrum for relatively lower visibilities. In some embodiments, the visibility scales 204 and 224 could be scaled to indicate the runway visual range (RVR) unit of measurement or other units suitable to convey a measurement of visibility.

The ceiling scale 232 may be a scale used to present the minimum ceiling indicator 234, the observed ceiling indicator 236, and the forecast ceiling indicator 238 for the IAP. Similar to the visibility scale 224, the spacing of the graduations of the ceiling scale 232 may be configurable by a manufacturer and/or end user. The spacing of the graduations is non-linear, providing a wider spectrum for relatively lower ceilings.

For the discussion of FIGS. 4A through 8C, predefined landing minima corresponding to the RNAV (GPS) Y RWY 10L IAP at Portland International Airport (KPDX) (the KPDX IAP) are used to illustrate how weather information may be conveyed by the weather indicator 202. It should be noted that the landing minima are provided for the sole purpose of discussing the exemplary concepts disclosed herein and should not to be used or relied upon for the purpose of navigation.

Figure 4A:
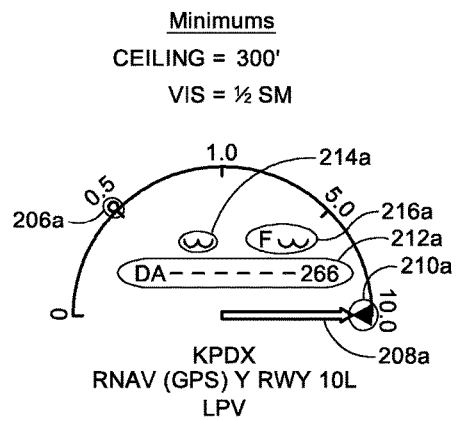
FIG. 4A depicts an exemplary embodiment of the weather indicator of FIG. 3A presenting reported weather information corresponding to first landing minimums of an exemplary instrument approach procedure (IAP) according to the inventive concepts disclosed herein.
Figure 5A:
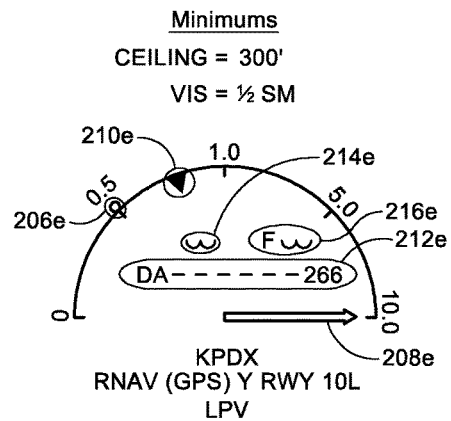
FIG. 5A depicts an exemplary embodiment of the weather indicator of FIG. 4A presenting second reported weather information according to the inventive concepts disclosed herein.
Figure 6A:
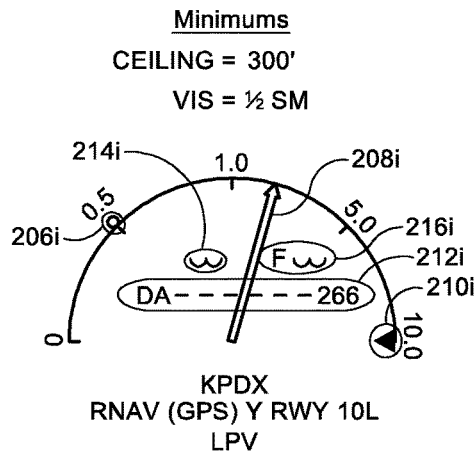
FIG. 6A depicts an exemplary embodiment of the weather indicator of FIG. 4A presenting third reported weather information according to the inventive concepts disclosed herein.

Referring now to FIGS. 4A, 5A, and 6A, predefined landing minima corresponding to a LPV (localizer performance with vertical guidance) approach of the KPDX IAP are 300 feet for minimum ceiling and ½ mile for minimum visibility, and a predefined decision altitude (DA) is 266 feet. As shown, the minimum visibility is presented by the minimum visibility indicators 206a, 206e, and 206i; and the predefined DA is included with the minimum ceiling indicators 212a, 212e, and 212i.

Figure 4B:
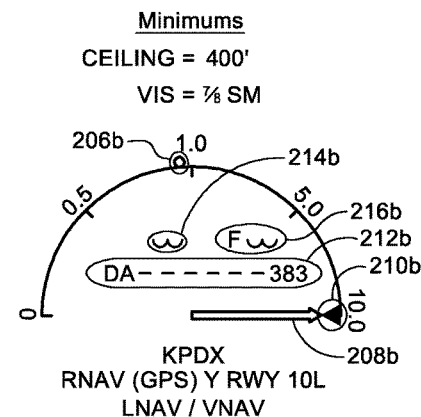
FIG. 4B depicts an exemplary embodiment of the weather indicator of FIG. 3A presenting reported weather information corresponding to second landing minimums of the exemplary IAP according to the inventive concepts disclosed herein.
Figure 5B:
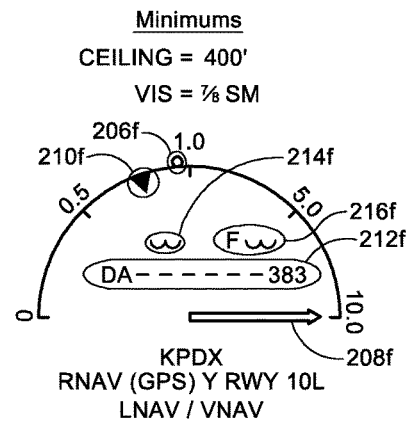
FIG. 5B depicts an exemplary embodiment of the weather indicator of FIG. 4B presenting second reported weather information according to the inventive concepts disclosed herein.
Figure 6B:
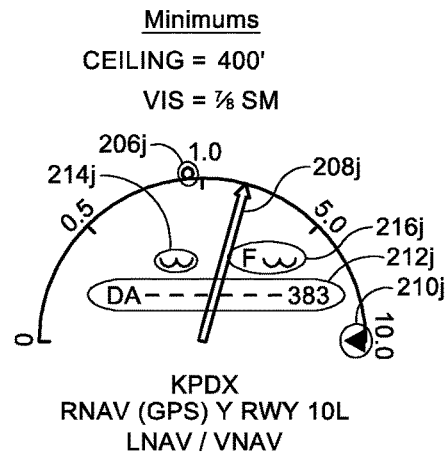
FIG. 6B depicts an exemplary embodiment of the weather indicator of FIG. 4B presenting third reported weather information according to the inventive concepts disclosed herein.

Referring now to FIGS. 4B, 5B, and 6B, predefined landing minima corresponding to a LNAV/VNAV (lateral navigation/vertical navigation) approach of the KPDX IAP are 400 feet and ⅞ mile, and a predefined DA is 383 feet. As shown, the minimum visibility is presented by the minimum visibility indicators 206b, 206f, and 206j; and the predefined DA is included with the minimum ceiling indicators 212b, 212f, and 212j.

Figure 4C:
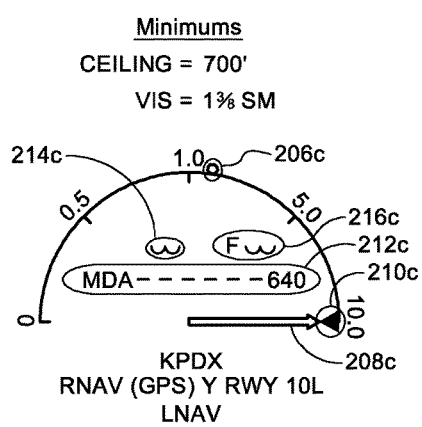
FIG. 4C depicts an exemplary embodiment of the weather indicator of FIG. 3A presenting reported weather information corresponding to third landing minimums of the exemplary IAP according to the inventive concepts disclosed herein.
Figure 5C:
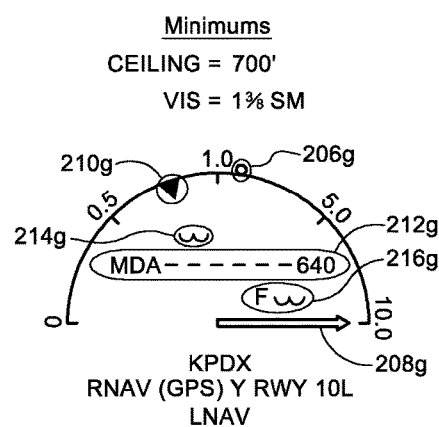
FIG. 5C depicts an exemplary embodiment of the weather indicator of FIG. 4C presenting second reported weather information according to the inventive concepts disclosed herein.
Figure 6C:
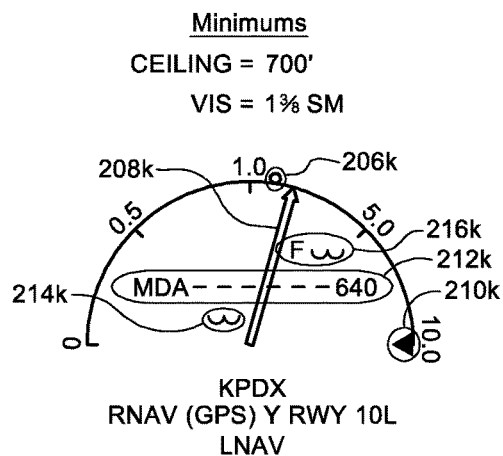
FIG. 6C depicts an exemplary embodiment of the weather indicator of FIG. 4C presenting third reported weather information according to the inventive concepts disclosed herein.

Referring now to FIGS. 4C, 5C, and 6C, predefined landing minima corresponding to an LNAV approach of the KPDX IAP are 700 feet and 1⅜ miles, and a predefined minimum descent altitude (MDA) is 640 feet. As shown, the minimum visibility is presented by the minimum visibility indicators 206c, 206g, and 206k; and the predefined MDA is included with the minimum ceiling indicators 212c, 212g, and 212k.

Figure 4D:
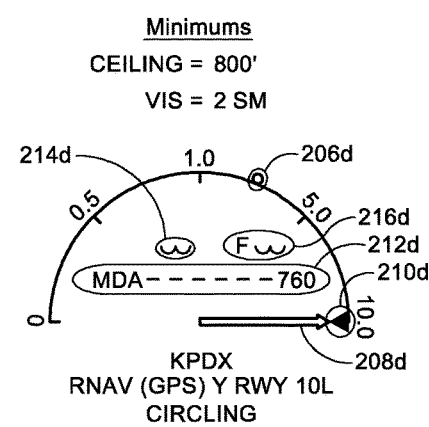
FIG. 4D depicts an exemplary embodiment of the weather indicator of FIG. 3A presenting reported weather information corresponding to third landing minimums of the exemplary IAP according to the inventive concepts disclosed herein.
Figure 5D:
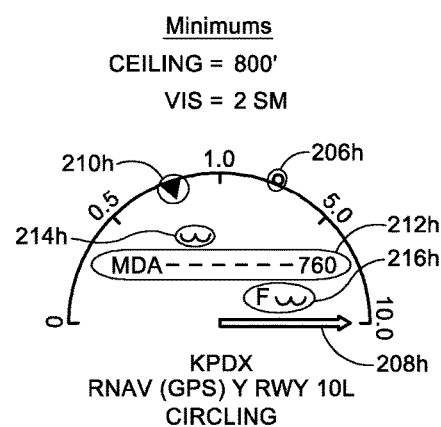
FIG. 5D depicts an exemplary embodiment of the weather indicator of FIG. 4D presenting second reported weather information according to the inventive concepts disclosed herein.
Figure 6D:
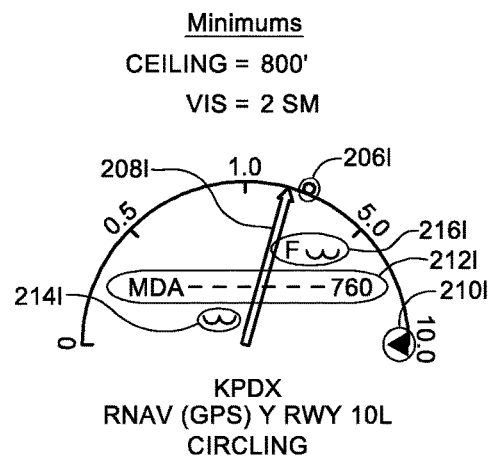
FIG. 6D depicts an exemplary embodiment of the weather indicator of FIG. 4D presenting third reported weather information according to the inventive concepts disclosed herein.
Figure 7A:
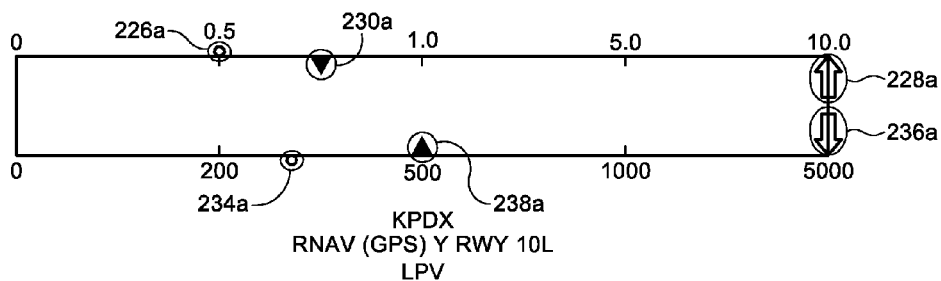
FIG. 7A depicts an exemplary embodiment of an alternative configuration of a weather indicator for presenting weather information of FIG. 5A according to the inventive concepts disclosed herein.
Figure 7B:
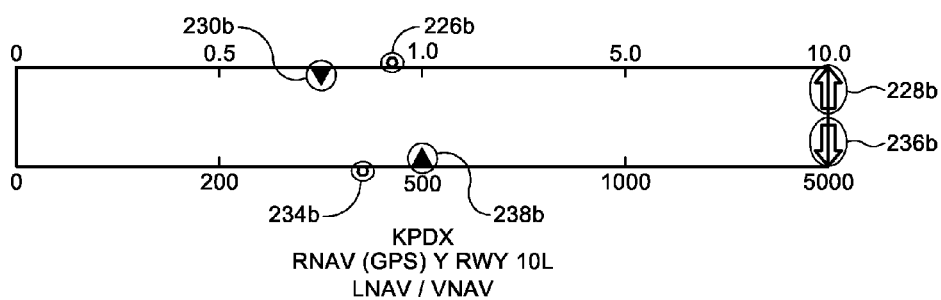
FIG. 7B depicts an exemplary embodiment of an alternative configuration of a weather indicator for presenting weather information of FIG. 5B according to the inventive concepts disclosed herein.
Figure 7C:
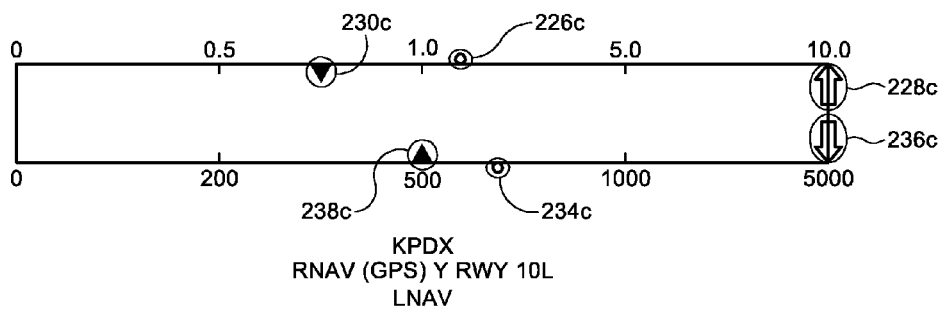
FIG. 7C depicts an exemplary embodiment of an alternative configuration of a weather indicator for presenting weather information of FIG. 5C according to the inventive concepts disclosed herein.
Figure 7D:
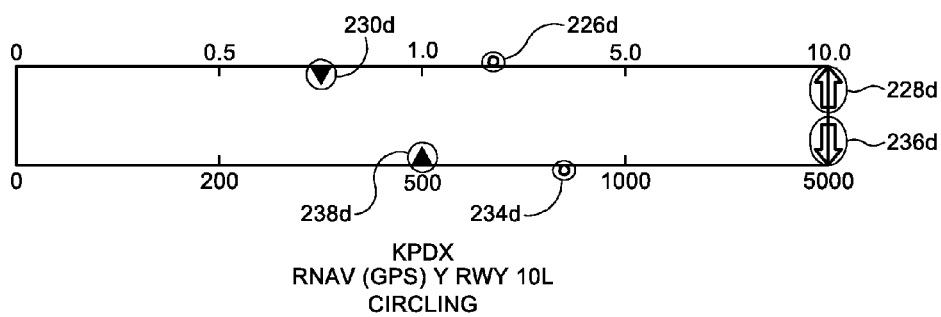
FIG. 7D depicts an exemplary embodiment of an alternative configuration of a weather indicator for presenting weather information of FIG. 5D according to the inventive concepts disclosed herein.

Referring now to FIGS. 4D, 5D, and 6D, predefined landing minima corresponding to a CIRCLING approach of the KPDX IAP are 800 feet and 2 miles, and a predefined MDA is 760 feet. As shown, the minimum visibility is presented by the minimum visibility indicators 206d, 206h, and 206l; and the predefined MDA is included with the minimum ceiling indicators 212d, 212h, and 212l.

Referring now to FIGS. 4A through 4D, it is assumed that the observed and forecasted ceiling are 5,000 feet, and the observed and forecasted visibility are 10 miles. As shown, the observed visibility is presented by the observed visibility indicators 208a, 208b, 208c, and 208d, and the forecasted visibility is presented by the forecasted visibility indicators 210a, 210b, 210c, and 210d. Upon being viewed, the pilot could determine that observed and forecasted visibilities exceed the minimum visibilities of the four approaches of the KPDX IAP.

The observed ceiling is presented by relative locations of the observed ceiling indicators 214a, 214b, 214c, and 214d with respect to the minimum ceiling indicators 212a, 212b, 212c, and 212d; likewise, the forecasted ceiling is presented by relative locations of the forecast ceiling indicators 216a, 216b, 216c, and 216d with respect to the minimum ceiling indicators 212a, 212b, 212c, and 212d. By locating the cloud symbols of the observed ceiling indicators 214a, 214b, 214c, and 214d and the forecast ceiling indicators 216a, 216b, 216c, and 216d above the minimum ceiling indicators 212a, 212b, 212c, and 212d, the pilot is visually informed at a glance by the positional relationship that the observed and forecasted ceilings are higher than the respective DAs and MDAs. Upon being viewed, the pilot could determine that observed and forecasted ceilings exceed the minimum ceilings of the four approaches of the KPDX IAP.

Referring now to FIGS. 5A through 5D, it is assumed that the observed ceiling and visibility remain at 5,000 feet and 10 miles, but the forecasted ceiling and visibility are 500 feet and ¾ mile. As shown, the observed visibility is presented by the observed visibility indicators 208e, 208f, 208g, and 208h, and the forecasted visibility is presented by the forecast visibility indicators 210e, 210f, 210g, and 210h. Upon being viewed, the pilot could determine that observed visibility exceeds the minimum visibilities of the four approaches of the KPDX IAP, but that the visibility is predicted to exceed only the minimum visibility for the LPV approach at the forecasted time. To draw the pilot's attention to the unfavorable condition where the visibility is not predicted to exceed a minimum visibility, the forecast visibility indicators 210f, 210g, and 210h may be configured to change their visual appearances. In some embodiments, the forecast visibility indicators 210f, 210g, and 210h may be configured to change colors and/or flash intermittently.

The observed ceiling is presented by relative locations of the observed ceiling indicators 214e, 214f, 214g, and 214h with respect to the minimum ceiling indicators 212e, 212f, 212g, and 212h; likewise, the forecasted ceiling is presented by relative locations of the forecast ceiling indicators 216e, 216f, 216g, and 216h with respect to the minimum ceiling indicators 212e, 212f, 212g, and 212h, where 216e and 216f are located above and 216g and 216h are located below. Because of these locations, the pilot could determine that observed ceiling exceeds the minimum ceilings of the four approaches of the KPDX IAP, but that the ceiling is predicted to exceed only the minimum visibilities of the LPV and LNAV/VNAV approaches at the forecasted time. To draw the pilot's attention to the unfavorable condition where the ceiling is not predicted to exceed a minimum ceiling, the forecast ceiling indicators 216g and 216h may be configured to change their visual appearances. In some embodiments, the forecast ceiling indicators 216g and 216h may be configured to change colors and/or flash intermittently.

Referring now to FIGS. 6A through 6D, it is assumed that the observed ceiling and visibility are 500 feet and 1½ miles, and that forecasted ceiling and visibility are 5,000 feet and 10 miles. As shown, the observed visibility is presented by the observed visibility indicators 208i, 208j, 208k, and 208l, and the forecasted visibility is presented by the forecasted visibility indicators 210i, 210j, 210k, and 210l. Upon being viewed, the pilot could determine that the observed visibility is lower than the minimum visibility for the CIRCLING approach, but that the visibility is predicted to exceed the minimum visibilities of the four approaches of the KPDX IAP at the forecasted time. To draw the pilot's attention to the unfavorable condition where the observed visibility is lower than a minimum visibility, the observed visibility indicator 208l may be configured to change its visual appearance. In some embodiments, the observed visibility indicator 208l may be configured to change color and/or flash intermittently.

The observed ceiling is presented by relative locations of the observed ceiling indicators 214i, 214j, 214k, and 214l with respect to the minimum ceiling indicators 212i, 212j, 212k, and 212l, where 214i and 214j are located above and 214k and 214l are located below; likewise, the forecasted ceiling is presented by relative locations of the forecast ceiling indicators 216i, 216j, 216k, and 216l with respect to the minimum ceiling indicators 212i, 212j, 212k, and 212l. Because 214i and 214j are located above 212i and 212j but 214k and 214l are located below 212k and 212l, the pilot could determine that the observed ceiling is lower than the minimum ceilings of the LNAV and CIRCLING approaches, but that ceiling is predicted to exceed the minimum ceilings for the four approaches of the KPDX IAP at the forecasted time. To draw the pilot's attention to the unfavorable condition where the observed ceiling is lower than a minimum ceiling, the observed ceiling indicators 214k and 214l may be configured to change their visual appearances. In some embodiments, the observed ceiling indicators 214k and 214l may be configured to change colors and/or flash intermittently.

Although the weather indicators shown in FIGS. 4A through 6D have been configured with circular or rounded visibility scales, other shapes could be configured by a manufacturer and/or end user.

Referring now to FIGS. 7A through 7D, rectangular weather indicators could convey the same weather information as conveyed by those of FIGS. 5A through 5D. The minimum visibilities of the four approaches of the KPDX IAP are presented respectively by the minimum visibility indicators 226a through 226d; and the minimum ceilings are presented respectively by the minimum ceiling indicators 234a through 234d indicating the respective DAs and MDAs. The observed ceiling of 5,000 feet is presented by the observed ceiling indicators 236a through 236d, and the observed visibility of 10 miles is presented by the observed visibility indicators 228a through 228d. The forecasted ceiling of 500 feet is presented by the observed ceiling indicators 238a through 238d, and the forecasted visibility of ¾ mile is presented by the forecasted visibility indicators 230a through 230d. To draw the pilot's attention to an unfavorable condition where the visibility is not predicted to exceed a minimum visibility at the forecasted time, the forecast visibility indicators 230b, 230c, and 230d may be configured to change their visual appearances in the same or similar manner as discussed above. To draw the pilot's attention to the unfavorable condition where the ceiling is not predicted to exceed a minimum ceiling at a forecasted time, the forecast ceiling indicators 238c and 238d may be configured to change their visual appearances in the same or similar manner as discussed above.

Figure 8A:
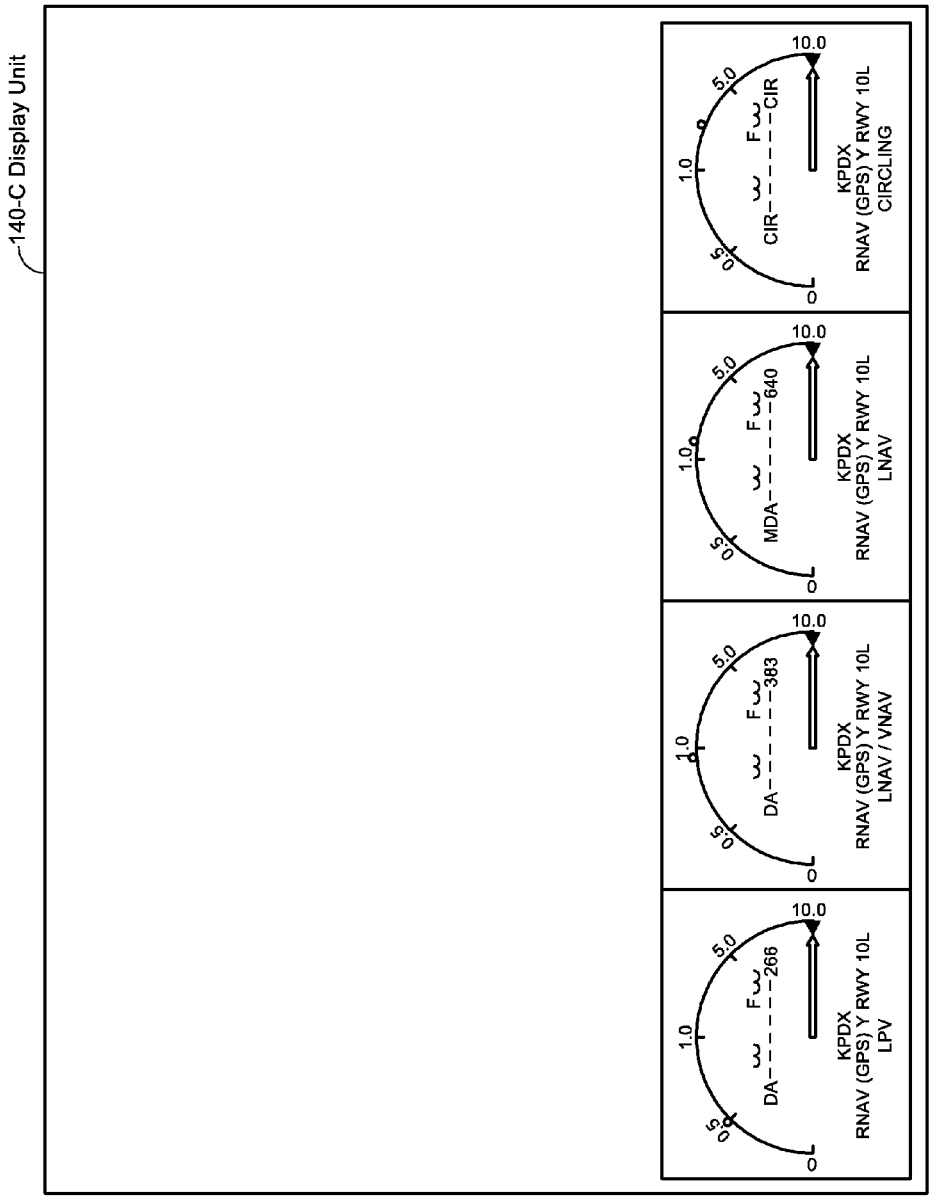
FIG. 8A depicts an exemplary embodiment of the weather indicators of FIGS. 4A through 4D disposed horizontally on a display unit according to the inventive concepts disclosed herein.
Figure 8B:
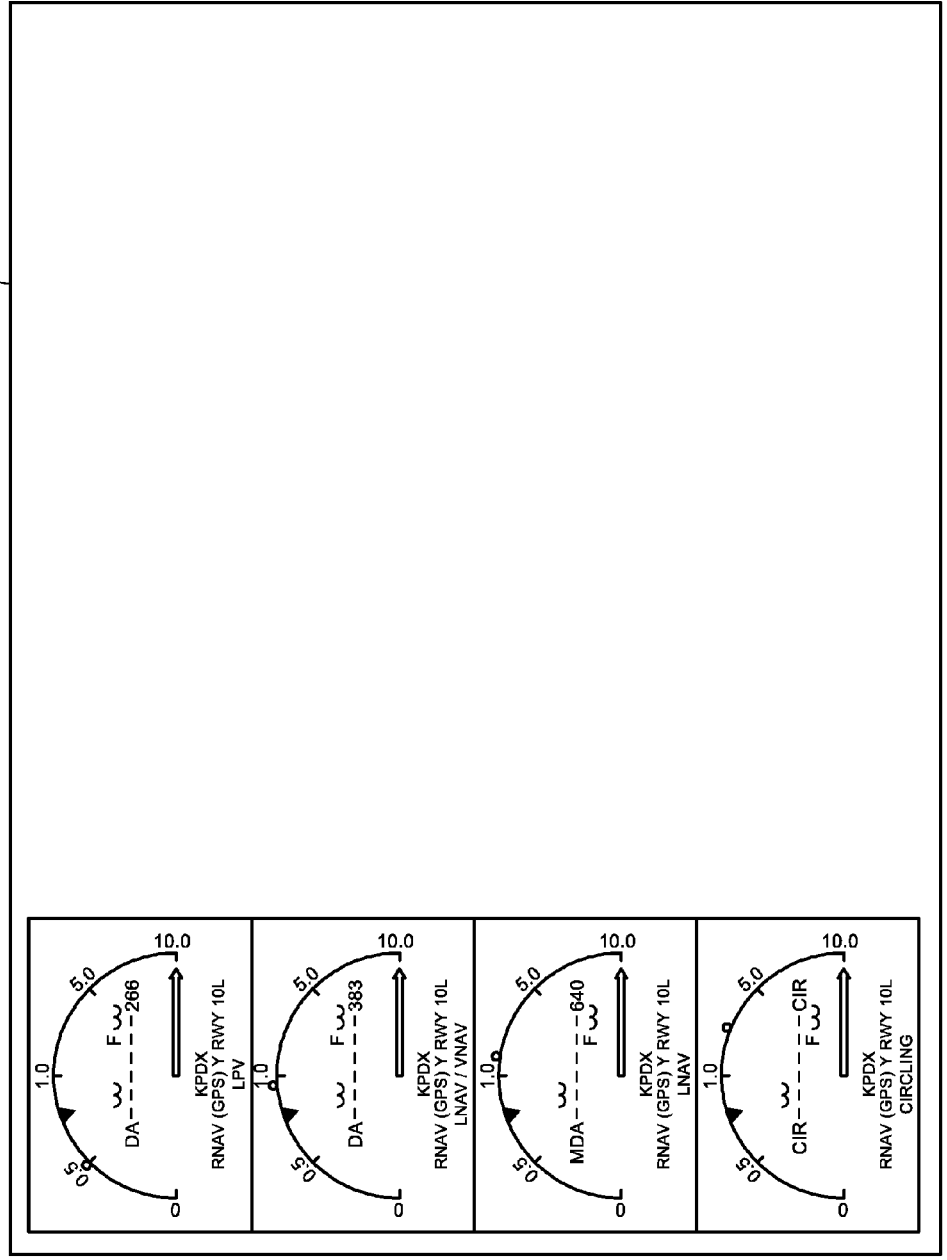
FIG. 8B depicts an exemplary embodiment of the weather indictors of FIGS. 5A through 5D disposed vertically on a display unit according to the inventive concepts disclosed herein.

Referring now to FIGS. 8A through 8B, an array of a plurality of weather indicators may be displayed to the pilot on an HDD 140-C and HDD 140-D, respectively, configured to present display or image other than the display or image of tactical information shown in FIG. 2A. A viewer of the HDD 140-C and HDD 140-D may be presented with a plurality of approaches of an IAP (or a plurality of individual IAPs) for one airport simultaneously in one display and readily determine whether the observed and/or forecasted weather conditions meets or exceeds the landing minima of one or more IAP(s).

As shown in FIG. 8A, the weather indicators of FIGS. 4A through 4D are disposed horizontally. Upon being viewed, the pilot could determine in one image that any one of the four approaches of the KPDX IAP are favorable because the observed and forecasted visibilities and the observed and forecasted ceilings exceed the predefined landing minima.

As shown in FIG. 8B, the weather indicators of FIGS. 5A through 5D are disposed vertically. Upon being viewed, the pilot could determine in one image that the LPV approach is favorable because the observed and forecasted visibilities and the observed and forecasted ceilings exceed the predefined landing minima. As stated above, when the visibility is not predicted to exceed a minimum visibility, the pilot's attention may be drawn to this unfavorable condition by changing the visual appearances of the forecast visibility indicators 210f, 210g, and 210h; then, in the one image, the pilot may observe and determine the existence of unfavorable conditions of the LNAV/VNAV, LNAV, and CIRCLING approaches. Moreover, as stated above, when the ceiling is not predicted to exceed a minimum ceiling, the pilot's attention may be drawn to this unfavorable condition by changing the visual appearances of the forecast ceiling indicators 216g and 216h; then, in one image, the pilot may observe and determine the existence of unfavorable conditions of the LNAV and CIRCLING approaches.

Figure 9:
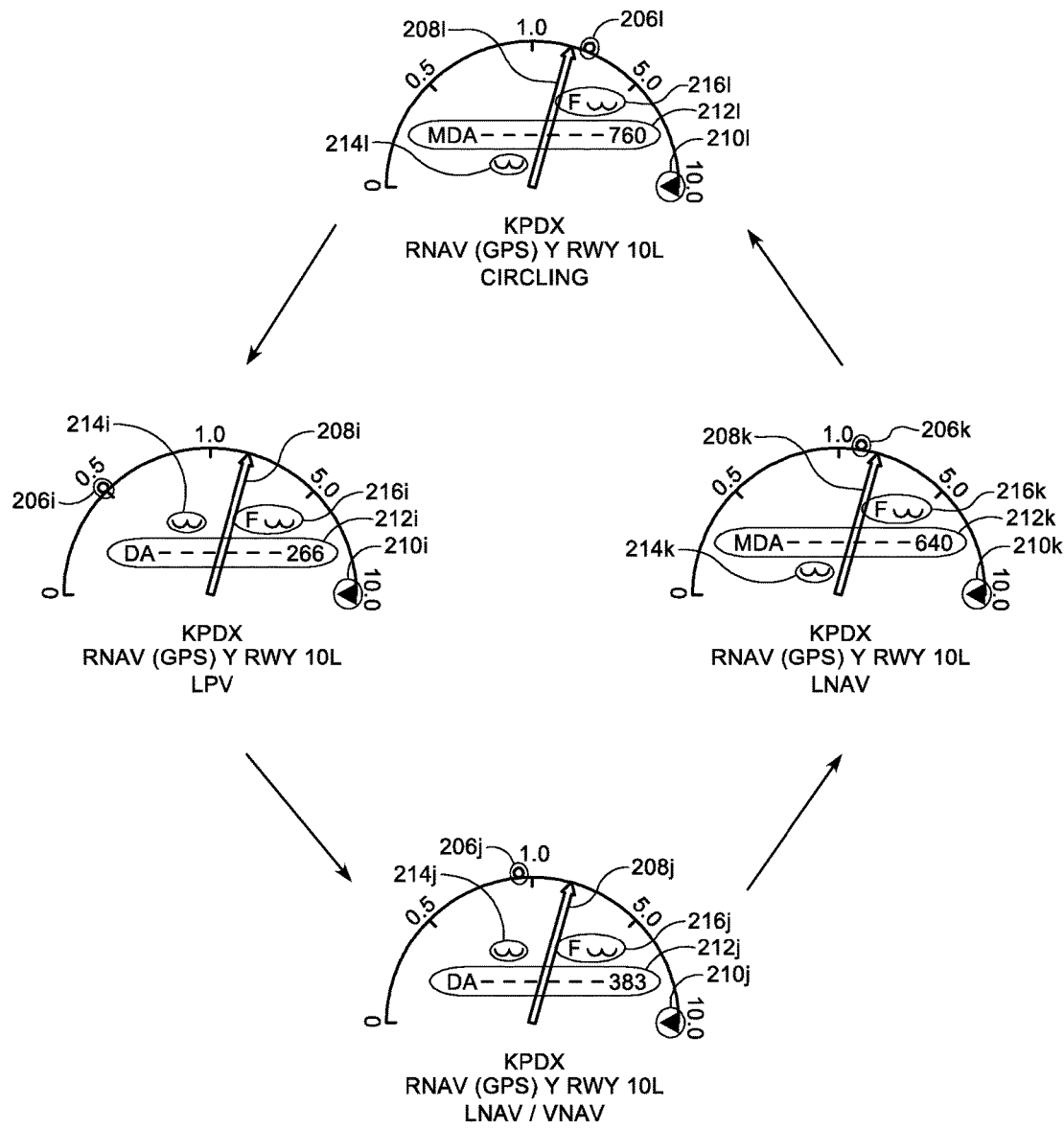
FIG. 9 depicts an exemplary embodiment of the weather indictors of FIGS. 6A through 6D being sequentially presented on a display unit according to the inventive concepts disclosed herein.

Referring now to FIG. 9, weather indicators may be presented sequentially; to illustrate, the weather indicators of FIGS. 6A through 6D are presented in FIG. 9. Upon being viewed, the pilot could determine in the sequence of images that the LPV and LNAV/VNAV are favorable because the observed and forecasted visibilities and the observed and forecasted ceilings exceed the predefined landing minima. When the observed visibility is lower than a minimum visibility, the pilot's attention may be drawn to this unfavorable condition. This is illustrated by observing the shift of locations between the minimum visibility indicators 206k and 206l with reference to the observed visibility indicators 208k and 208l, respectively. During the sequence, the minimum visibility indicator 206k is shown to the right of the observed visibility indicator 208k followed by the minimum visibility indicator 206l being shown to the right of the observed visibility indicator 208l; also, the pilot's attention may be drawn to a sequential change to the visual appearances between the observed visibility indicator 208k and the observed visibility indicator 208l.

Moreover, when the observed ceiling is lower than a minimum ceiling, the pilot's attention may be drawn to this unfavorable condition. This is illustrated by observing the shift of locations between the observed ceiling indicators 214j and 214k with respect to the minimum ceiling indicators 212j and 212k, respectively. During the sequence, the observed ceiling indicator 214j is shown above the minimum ceiling indicator 212j followed by the observed ceiling indicator 214k being shown below the minimum ceiling indicator 212k; also, the pilot's attention may be drawn to a sequential change to the visual appearances between the observed ceiling indicator 214j and the observed ceiling indicator 214k.

Figure 10:
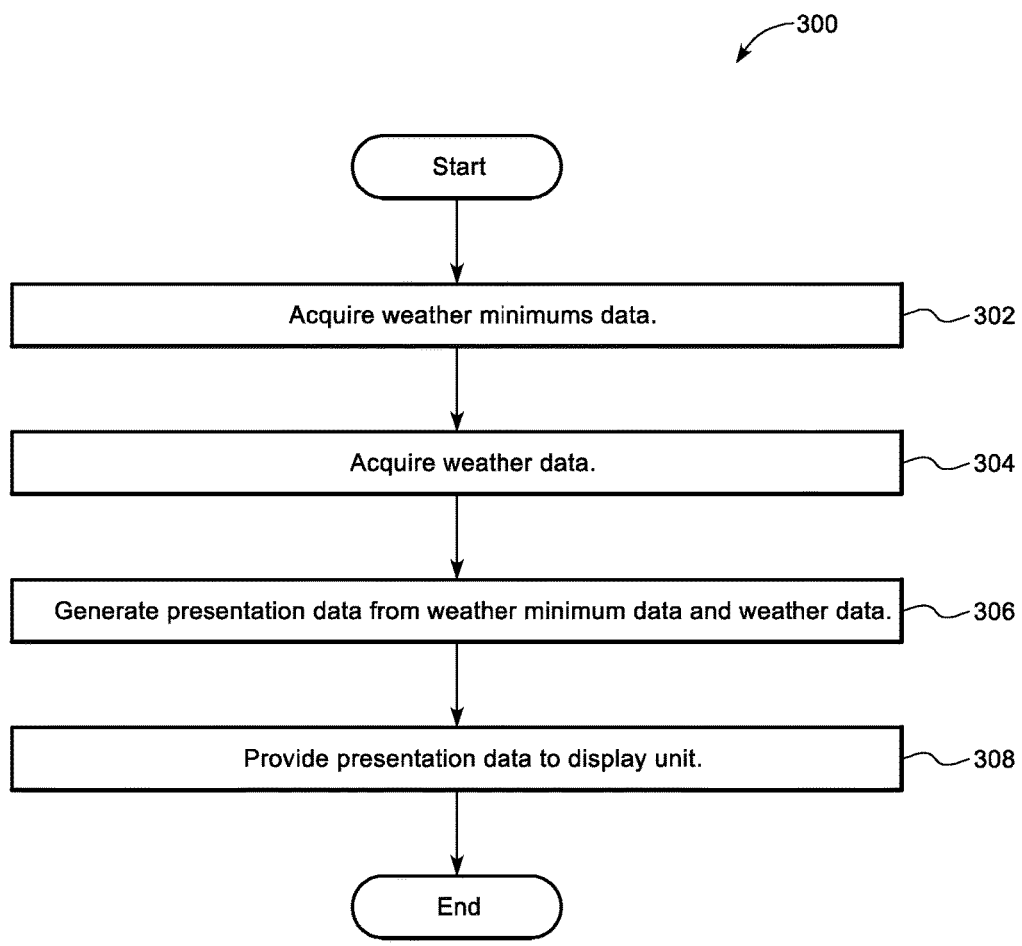
FIG. 10 depicts an exemplary embodiment of a flowchart disclosing a method for generating a weather indicator according to the inventive concepts disclosed herein.

FIG. 10 depicts flowchart 300 disclosing an example of a method for generating one or more weather indicators, where the IG 130 may be programmed or configured with instructions corresponding to the modules embodied in flowchart 300. In some embodiments, the IG 130 may be a processor or a combination of processors found in the display unit 140 or any other system suitable for performing the task. Also, the IG 130 may be a processor of a module such as, but not limited to, a printed circuit card having one or more input interfaces to facilitate the two-way data communications of the IG 130, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the IG 130 acquiring data representative of predefined landing minima and/or other predefined weather minima for one or more runways and/or one or more airport(s). In some embodiments, the predefined landing minima may be acquired from the WMDS 110. In other embodiments, the airport could be the departure airport, the destination airport, and/or an alternate airport as stated in a flight plan.

The flowchart 300 continues with module 304 with the IG 130 acquiring weather data representative of at least observed weather information for one or more of the airports represented in the airport data. In some embodiments, the observed weather information could include values of the measured ceiling and/or measured visibility provided by one or more weather reports and acquired from the WDS 120. In other embodiments, the weather data could be further representative of forecasted weather information including values of the forecasted ceiling and/or forecasted visibility provided by one or more weather reports and acquired from the WDS 120.

The flowchart 300 continues with module 306 with the IG 130 generating of presentation data as a function of the airport data and the weather data. The presentation data may be representative a weather indicator presentable to one or more viewers. In some embodiments, weather indicator could include a minimum ceiling indicator, a ceiling indicator, a minimum visibility indicator, a visibility indicator, and a visibility scale. The position of the ceiling indicator could be dependent upon the reported ceiling, the position of the minimum visibility indicator could be referenced to the visibility scale and dependent upon the predefined minimum visibility, and the position of the visibility indicator could be referenced to the visibility scale and dependent upon the reported visibility.

In other embodiments, the minimum ceiling indicator and the minimum visibility indicator could indicate defined landing minima of an instrument approach procedure, and the ceiling indicator and the visibility indicator could indicate a reported ceiling and a reported visibility, respectively. The reported ceiling and reported visibility could be an observed ceiling and an observed visibility, respectively; and the reported ceiling and reported visibility could be a forecasted ceiling and a forecasted visibility, respectively.

In other embodiments, the visual appearance of the ceiling indicator could change if the reported ceiling is at least less than the predefined minimum ceiling, and the visual appearance of the visibility indicator changes if the reported visibility is at least less than the predefined minimum visibility.

The method of flowchart 300 continues with module 308 with the IG 130 providing the presentation data to the display unit(s) 140. Each display unit 140 may be configured to receive the presentation data and present one or more images or displays of weather indicators presentable to a one or more viewers, whereby observed and/or forecasted weather information applicable to one or more IAPs at one or more airports is presented in a graphical format to the viewer. Upon being viewed, the pilot could determine the presence or existence of one or more favorable and/or unfavorable IAPs. Then, the method of flowchart 300 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A weather indicator, comprising:
a visibility scale;
a minimum ceiling indicator;
a ceiling indicator having a position dependent upon a reported ceiling;
a minimum visibility indicator having a position referenced to the visibility scale and dependent upon a predefined minimum visibility; and
a visibility indicator having a position referenced to the visibility scale and dependent upon a reported visibility, where the visibility scale, the minimum ceiling indicator, the ceiling indicator, the minimum visibility indicator, and the visibility indicator are presented to at least one viewer.

2. The weather indicator of claim 1, wherein
the minimum ceiling indicator and the minimum visibility indicator indicate defined landing minima of an instrument approach procedure, and
the ceiling indicator and the visibility indicator indicate a reported ceiling and a reported visibility, respectively.

3. The weather indicator of claim 2, wherein the reported ceiling and reported visibility are an observed ceiling and an observed visibility, respectively.

4. The weather indicator of claim 2, wherein the reported ceiling and reported visibility are a forecasted ceiling and a forecasted visibility, respectively.

5. The weather indicator of claim 4, where the ceiling indicator is a first ceiling indicator and the visibility indicator is a first visibility indicator, further comprising:
a second ceiling indicator; and
a second visibility indicator, such that
the second ceiling indicator and the second visibility indicator indicate an observed ceiling and an observed visibility, respectively.

6. The weather indicator of claim 1, wherein
the visibility scale is comprised of a plurality of graduations and a plurality of digits, such that
the minimum visibility indicator and the visibility indicator display a numerical measurement of the predefined minimum visibility and the reported visibility, respectively.

7. The weather indicator of claim 1, further comprising:
a ceiling scale, such that
the ceiling scale is comprised of a plurality of graduations and a plurality of digits, such that
the minimum ceiling indicator and the ceiling indicator display a numerical measurement of the predefined ceiling visibility and the reported ceiling, respectively.

8. A system for generating a weather indicator, comprising:
a source of first weather data;
a source of second weather data; and
an image generator including at least one processor coupled to a non-transitory processor-readable medium storing processor-executable code and configured to:
acquire first weather data from the source of first weather data and representative of a predefined minimum ceiling and a predefined minimum visibility;
acquire second weather data from the source of second weather data and representative of a reported ceiling and a reported visibility; and
generate presentation data based upon the first weather data and the second weather data and representative of a weather indicator comprising:
a visibility scale;
a minimum ceiling indicator;
a ceiling indicator having a position dependent upon the reported ceiling;
a minimum visibility indicator having a position referenced to the visibility scale and dependent upon the predefined minimum visibility;
a visibility indicator having a position referenced to the visibility scale and dependent upon the reported visibility, such that
the weather indicator represented in the presentation data is presentable to at least one viewer.

9. The system of claim 8, wherein the source of first weather data and the source of the second weather data are the same source.

10. The system of claim 8, wherein
a visual appearance of the ceiling indicator changes if the reported ceiling is at least less than the predefined minimum ceiling, and
a visual appearance of the visibility indicator changes if the reported visibility is at least less than the predefined minimum visibility.

11. The system of claim 10, further comprising:
providing the presentation data to the at least one display unit, whereby
the at least one display unit presents the weather indicator represented in the presentation data to the at least one viewer.

12. The system of claim 8, wherein
the predefined minimum ceiling is a first predefined minimum ceiling;
the predefined minimum visibility is a first predefined minimum visibility;
the weather indicator is a first weather indicator;
the minimum ceiling indicator is a first minimum ceiling indicator; and
the minimum visibility indicator is a first minimum visibility indicator, further comprising:
the first weather data is further representative of at least one second predefined minimum ceiling and at least one second predefined minimum visibility; and
the presentation data is further representative of at least one second weather indicator comprised of:
a second minimum ceiling indicator; and
a second minimum visibility indicator, such that
a position of the second minimum visibility indicator is referenced to the visibility scale and dependent upon the second predefined minimum visibility, whereby
the at least one second weather indicator represented in the presentation data is presentable to the at least one viewer.

13. The system of claim 12, wherein the weather indicator represented in the presentation data and the at least one second weather indicator represented in the presentation data are presented simultaneously in a visual array.

14. The system of claim 12, wherein the weather indicator represented in the presentation data and the at least one second weather indicator represented in the presentation data are presented sequentially.

15. The system of claim 8, further comprising:
at least one display unit, such that
the image generator is further configured to provide the presentation data to the at least one display unit, whereby
the at least one display unit presents the weather indicator represented in the presentation data to the at least one viewer.

16. A method for generating a weather indicator, comprising:
acquiring, by at least one processor executing processor-executable code, first weather data from a source of first weather data and representative of a predefined minimum ceiling and a predefined minimum visibility;
acquiring second weather data from a source of second weather data and representative of a reported ceiling and a reported visibility, and generating presentation data based upon the first weather data and the second weather data and representative of a weather indicator comprising:
a visibility scale;
a minimum ceiling indicator;
a ceiling indicator having a position dependent upon the reported ceiling;
a minimum visibility indicator having a position referenced to the visibility scale and dependent upon the predefined minimum visibility;
a visibility indicator having a position referenced to the visibility scale and dependent upon the reported visibility, such that
the weather indicator represented in the presentation data is presentable to at least one viewer.

17. The method of claim 16, wherein
a visual appearance of the ceiling indicator changes if the reported ceiling is at least less than the predefined minimum ceiling, and
a visual appearance of the visibility indicator changes if the reported visibility is at least less than the predefined minimum visibility.

18. The method of claim 16, wherein
the predefined minimum ceiling is a first predefined minimum ceiling;
the predefined minimum visibility is a first predefined minimum visibility;
the weather indicator is a first weather indicator;
the minimum ceiling indicator is a first minimum ceiling indicator; and
the minimum visibility indicator is a first minimum visibility indicator, wherein
the first weather data is further representative of at least one second predefined minimum ceiling and at least one second predefined minimum visibility, and
the presentation data is further representative of at least one second weather indicator comprised of:
a second minimum ceiling indicator, and
a second minimum visibility indicator, such that
a position of the second minimum visibility indicator is referenced to the visibility scale and dependent upon the second predefined minimum visibility, whereby
the at least one second weather indicator represented in the presentation data is presentable to the at least one viewer.

19. The method of claim 18, wherein the weather indicator represented in the presentation data and the at least one second weather indicator represented in the presentation data are presented simultaneously in a visual array.

20. The method of claim 18, wherein the weather indicator represented in the presentation data and the at least one second weather indicator represented in the presentation data are presented sequentially.

* * * * *